US011404684B2

(12) United States Patent
Mino et al.

(10) Patent No.: US 11,404,684 B2
(45) Date of Patent: Aug. 2, 2022

(54) LITHIUM SECONDARY BATTERY POSITIVE ELECTRODE AND LITHIUM SECONDARY BATTERY

(71) Applicant: Panasonic Intellectual Property Management Co., Ltd., Osaka (JP)

(72) Inventors: Shinji Mino, Osaka (JP); Takanori Maruo, Osaka (JP); Motoki Kinugawa, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 244 days.

(21) Appl. No.: 16/891,377

(22) Filed: Jun. 3, 2020

(65) Prior Publication Data

US 2020/0295350 A1 Sep. 17, 2020

Related U.S. Application Data

(63) Continuation of application No. PCT/JP2018/036626, filed on Oct. 1, 2018.

(30) Foreign Application Priority Data

Dec. 8, 2017 (JP) .............................. JP2017-236095

(51) Int. Cl.
*H01M 4/00* (2006.01)
*H01M 4/131* (2010.01)
(Continued)

(52) U.S. Cl.
CPC ............ *H01M 4/131* (2013.01); *G01N 13/00* (2013.01); *H01M 4/485* (2013.01); *H01M 4/623* (2013.01);
(Continued)

(58) Field of Classification Search
CPC ................. H01M 4/625; H01M 4/661; H01M 2004/021; H01M 4/662; H01M 4/485; H01M 4/623
See application file for complete search history.

(56) References Cited

U.S. PATENT DOCUMENTS

2004/0197652 A1   10/2004   Kimura et al.
2012/0183850 A1    7/2012   Yamaguchi et al.
(Continued)

FOREIGN PATENT DOCUMENTS

JP   2000-294229 A   10/2000
JP    2011-70994 A    4/2011
(Continued)

OTHER PUBLICATIONS

Extended Search Report dated Dec. 23, 2020, issued in counterpart EP Application No. 18885540.7 (9 pages).
(Continued)

*Primary Examiner* — Cynthia H Kelly
*Assistant Examiner* — Monique M Wills
(74) *Attorney, Agent, or Firm* — WHDA, LLP

(57) ABSTRACT

A lithium secondary battery positive electrode with: a metallic foil; and a positive electrode mixture layer formed on a surface of the metallic foil and containing a binding agent, a conductive agent, and a positive electrode active material comprising a lithium-transition metal complex oxide, wherein the positive electrode has a diameter of the liquid-removed space of at most 6.5 mm as measured by a wettability evaluation test, wherein a positive electrode is placed inside a container, and a prescribed test solution is added to a prescribed liquid-surface level, and nitrogen is sprayed thereon from a prescribed pipe at a prescribed pressure. A measurement is taken of the diameter of a region from which the solution has been removed by the spraying,
(Continued)

and a mean value of such diameters measured between 0.5 seconds and 1.5 seconds after the initiation of the spraying is used as the diameter of the liquid-removed space.

10 Claims, 4 Drawing Sheets

(51) Int. Cl.
  *G01N 13/00* (2006.01)
  *H01M 4/485* (2010.01)
  *H01M 4/62* (2006.01)
  *H01M 4/66* (2006.01)
  *H01M 10/0525* (2010.01)
  *H01M 4/02* (2006.01)

(52) U.S. Cl.
  CPC ........... *H01M 4/625* (2013.01); *H01M 4/661* (2013.01); *H01M 4/662* (2013.01); *H01M 10/0525* (2013.01); *H01M 2004/028* (2013.01)

(56) References Cited

U.S. PATENT DOCUMENTS

| | | |
|---|---|---|
| 2014/0356695 A1 | 12/2014 | Abe et al. |
| 2015/0072370 A1 | 3/2015 | Tanaka et al. |
| 2018/0212250 A1* | 7/2018 | Zhamu ................ H01M 4/625 |

FOREIGN PATENT DOCUMENTS

| | | |
|---|---|---|
| JP | 2013-254699 A | 12/2013 |
| JP | 2014-82075 A | 5/2014 |
| JP | 2017-112103 A | 6/2017 |
| WO | 2013/176264 A1 | 11/2013 |

OTHER PUBLICATIONS

International Search Report dated Nov. 27, 2018, issued in counterpart application No. PCT/JP2018/036626, w/ English translation (4 pages).

* cited by examiner

LITHIUM SECONDARY BATTERY POSITIVE ELECTRODE AND LITHIUM SECONDARY BATTERY

TECHNICAL FIELD

The present disclosure relates to a positive electrode for a lithium secondary battery, and a lithium secondary battery.

BACKGROUND ART

Downsizing and weight reduction of portable digital assistants such as mobile phones, laptops, and smartphones have rapidly been advanced recently, and a larger capacity is sought for a secondary battery as a power source thereof. A lithium secondary battery, which charges and discharges by migration of lithium ions between a positive electrode and a negative electrode, has a large energy density and a high capacity, and thus is widely used as a power source for a mobile data terminal.

PATENT LITERATURE 1 discloses a non-aqueous electrolyte secondary battery in which a positive electrode plate and a negative electrode plate in a laminated state with a separator interposed therebetween are housed together with an electrolyte solution in a battery case, a positive electrode material itself included therein or the prepared positive electrode plate having been undergone corona discharge treatment.

CITATION LIST

Patent Literature

PATENT LITERATURE 1: Japanese Unexamined Patent Application Publication No. 2000-294229
PATENT LITERATURE 2: WO 2013/176264

SUMMARY

It is an advantage of the present disclosure to provide a positive electrode for a lithium secondary battery that may be evaluated for its wettability to an electrolyte solution with accuracy and may improve battery cyclic characteristics of the lithium secondary battery, and also to provide a lithium secondary battery having improved battery cyclic characteristics.

The positive electrode for a lithium secondary battery of one aspect of the present disclosure is a positive electrode for a lithium secondary battery, comprising: metal foil, and a positive electrode mixture layer formed on at least one side of the metal foil and including a lithium/transition metal complex oxide as a positive electrode active material, a conductive agent, and a binder, wherein the positive electrode provides a liquid-removed space having a diameter of 6.5 mm or less in the following evaluation test for wettability. In the evaluation test for wettability, the positive electrode is placed in a container; a lithium hexafluorophosphate solution in a solvent composed of ethylene carbonate and ethyl methyl carbonate in a volume ratio of 3:7 is poured therein so that a height from a surface of the positive electrode to a liquid surface is 1.8 mm, the solution having a lithium hexafluorophosphate concentration of 1.3 mol/L; nitrogen gas is jetted out perpendicularly to the surface of the positive electrode at a pressure of 10 kPa from a tube having an inner diameter of 0.5 mm in an atmosphere at 20° C. or more and 25° C. or less, the tube being positioned such that a jet nozzle hole thereof is 8 mm apart from the liquid surface; a diameter of a space from which the solution is removed by jetting is measured; an average of the diameter during a period from 0.5 seconds to 1.5 seconds after starting jetting is taken as the diameter of the liquid-removed space.

According to one aspect of the present disclosure, there may be provided a positive electrode for a lithium secondary battery that may be evaluated for its wettability to an electrolyte solution with accuracy and may improve battery cyclic characteristics of the lithium secondary battery, and also a lithium secondary battery having improved battery cyclic characteristics.

DESCRIPTION OF EMBODIMENTS

Figure 1:
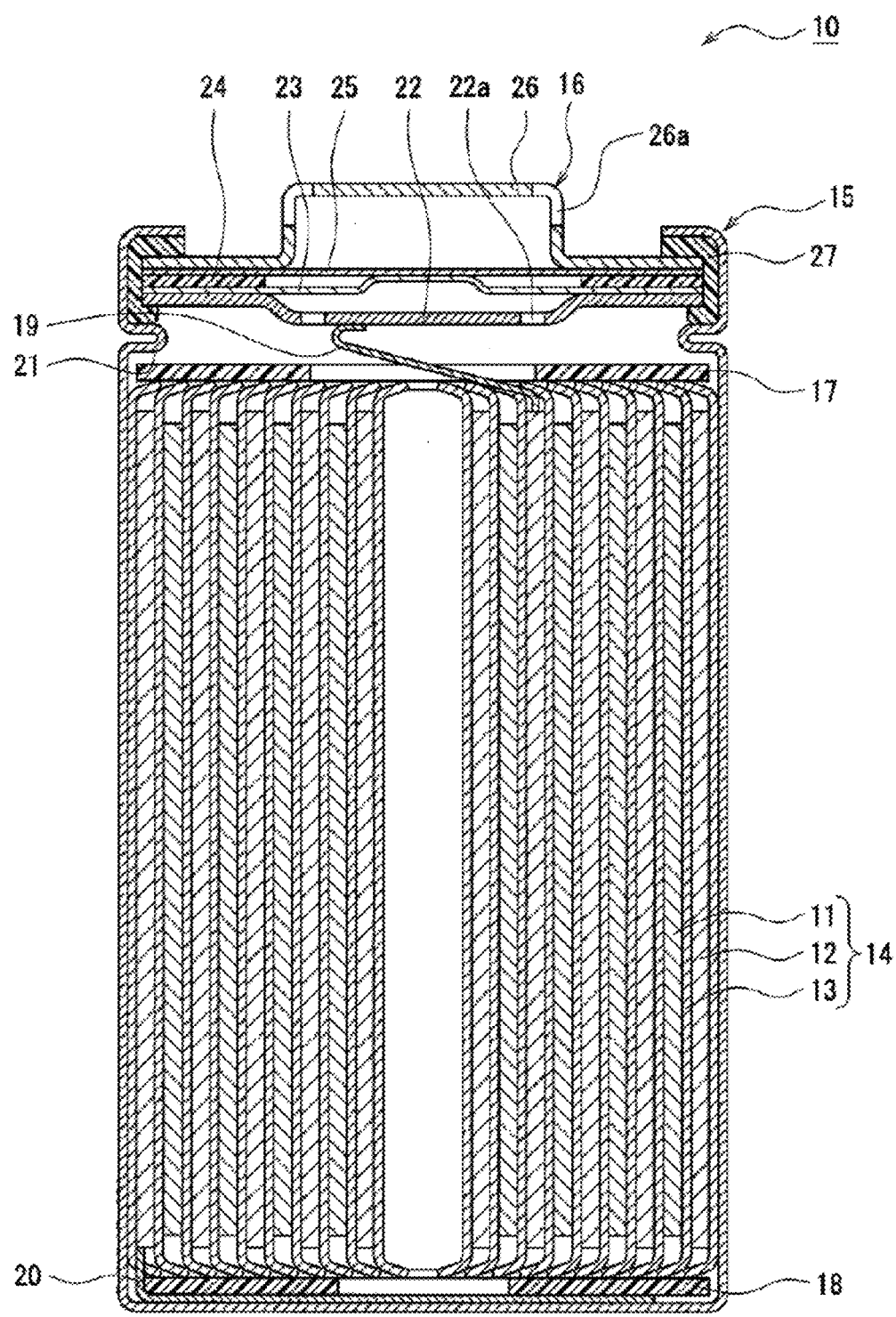
FIG. 1 is a sectional view illustrating a lithium secondary battery of an exemplary embodiment.

PATENT LITERATURE 1 discloses that the corona discharge treatment on the positive electrode material itself or the prepared positive electrode plate enhances the affinity of the positive electrode material of the positive electrode plate to an electrolyte solution. PATENT LITERATURE 1 also discloses that lithium ions thus easily reach the surface of the positive electrode material to improve charge/discharge characteristics, and that the wettability of the positive electrode material to the electrolyte solution is improved to provide a shortening effect on pouring period and therefore an improved productive efficiency.

Conventionally, a contact angle method is common for the evaluation of wettability of a substance, the method including forming a drop on the surface of the substance to be evaluated for its wettability, measuring the contact angle of the drop on the surface of the substance, and determining that the wettability is smaller when the value of the contact angle is larger and that the wettability is larger when the value of the contact angle is smaller. However, even when trying to evaluate the wettability of an electrode plate to an electrolyte solution, the electrolyte solution penetrates the mixture layer as the surface of the electrode plate so that the formation of a drop is difficult, and thus it is difficult to properly evaluate the wettability of an electrode plate to an electrolyte solution by the contact angle method.

There is a method disclosed in PATENT LITERATURE 2 as a method for evaluating wettability of a substance to a liquid. The method for evaluating a wetting characteristic includes removing a liquid by jetting a gas at a surface of an object covered with the liquid, measuring a dimension of a region where the liquid is removed after the gas jetting, and evaluating the wetting characteristic of the object using the measured dimension as an index. However, when trying to apply this method for evaluating wettability to evaluation of wettability of an electrode plate to an electrolyte solution, the electrolyte solution after the completion of jetting quickly fills back the region where the liquid has been removed by gas jetting, and thus it is difficult to measure the dimension of the region. Accordingly, it is difficult to properly evaluate wettability of an electrode plate to an electrolyte solution even by the method disclosed in PATENT LITERATURE 2.

As a result of earnest studies, the present inventors have found that a lithium secondary battery having improved battery cyclic characteristics can be provided by using a positive electrode providing a liquid-removed space having a diameter of a predetermined range or less in an evaluation test for wettability, the evaluation test including placing the positive electrode in a container, jetted out nitrogen gas at a predetermined pressure to the surface of the positive electrode covered with a predetermined solution, and measuring the diameter of the space from which the solution is removed during jetting to evaluate wettability of the positive electrode to an electrolyte solution with accuracy.

Hereinafter, exemplary embodiments will be described in detail with reference to drawings. However, the positive electrode and the lithium secondary battery of the present disclosure are not limited to the embodiments described hereinbelow. In the embodiments described below, a cylindrical battery is illustrated as an example, which includes an electrode assembly having a wound structure and a cylindrical battery case housing the electrode assembly; however, the structure of the electrode assembly is not limited to the wound structure, and may be a laminated structure formed by alternately laminating positive electrodes and negative electrodes with separators interposed therebetween. The shape of the battery case is not limited to a cylindrical shape, and the battery case may be a metal case having a rectangular shape (rectangular battery), a coin shape (coin-shaped battery), or another shape, or a resin-made case constituted of resin films (laminate battery). The drawings referred for the description of embodiments are schematically illustrated, and the dimensions and the like of each component should be determined in consideration of the description below.

<Lithium Secondary Battery>

FIG. 1 is a sectional view of a lithium secondary battery (battery 10) of an exemplary embodiment. As illustrated in FIG. 1, the battery 10 comprises an electrode assembly 14, a non-aqueous electrolyte (not shown), and a battery case housing the electrode assembly 14 and the non-aqueous electrolyte. The electrode assembly 14 has a wound structure in which a positive electrode for a lithium secondary battery (positive electrode 11) and a negative electrode for a lithium secondary battery (negative electrode 12) are wound together with a separator 13 interposed therebetween. The battery case is constituted of a cylindrical case body 15 having a closed-end and a sealing assembly 16 for closing the opening of the case body.

The battery 10 comprises insulating plates 17 and 18 respectively disposed on the upper and lower sides of the electrode assembly 14. In the example shown in FIG. 1, a positive electrode lead 19 attached to the positive electrode 11 passes through a through-hole in the insulating plate 17 and extends toward the sealing assembly 16, and a negative electrode lead 20 attached to the negative electrode 12 extends on the outside of the insulating plate 18 to the bottom side of the case body 15. The positive electrode lead 19 is connected to the lower surface of a filter 22, which is the bottom board of the sealing assembly 16, by welding or the like, and a cap 26, which is the top board of the sealing assembly 16 and electrically connected to the filter 22, serves as a positive terminal. The negative electrode lead 20 is connected to the inner surface of the bottom of the case body 15 by welding or the like, and the case body 15 serves as a negative terminal.

The case body 15 is, for example, a cylindrical metal container having a closed-end. A gasket 27 is provided between the case body 15 and the sealing assembly 16 to ensure that the battery case is tightly sealed. The case body 15 includes a projecting portion 21 formed by, for example, pressing the lateral surface from outside to support the sealing assembly 16. The projecting portion 21 is preferably formed annularly along the circumferential direction of the case body 15, and the upper surface thereof supports the sealing assembly 16.

The sealing assembly 16 includes the filter 22 and a vent member disposed thereon. The vent member blocks the filter opening 22a of the filter 22, and will rupture if the internal pressure of the battery 10 increases due to heat generation by internal short, for example. In the example shown in FIG. 1, a lower vent member 23 and an upper vent member 25 are provided as vent members, and an insulating member 24 is disposed between the lower vent member 23 and the upper vent member 25. Each of the members constituting the sealing assembly 16 has, for example, a disk or ring shape, and the members other than the insulating member 24 are electrically connected to each other. If the internal pressure of the battery 10 largely increases, the lower vent member 23 ruptures at, for example, the thin portion thereof. The upper vent member 25 thus bulges toward the cap 26 and comes off the lower vent member 23, thereby breaking the electrical connection therebetween. If the internal pressure increases further, the upper vent member 25 will rupture and gas flows out through the opening 26a of the cap 26.

<Positive Electrode for Lithium Secondary Battery>

The positive electrode 11 comprises metal foil as a positive electrode current collector and a positive electrode mixture layer formed on the positive electrode current collector. The positive electrode mixture layer includes a lithium/transition metal complex oxide as a positive electrode active material, a conductive agent, and a binder. The positive electrode 11 of the present embodiment provides a liquid-removed space having a diameter of 6.5 mm or less in the evaluation test for wettability described below.

(Evaluation Test for Wettability)

Figure 2:
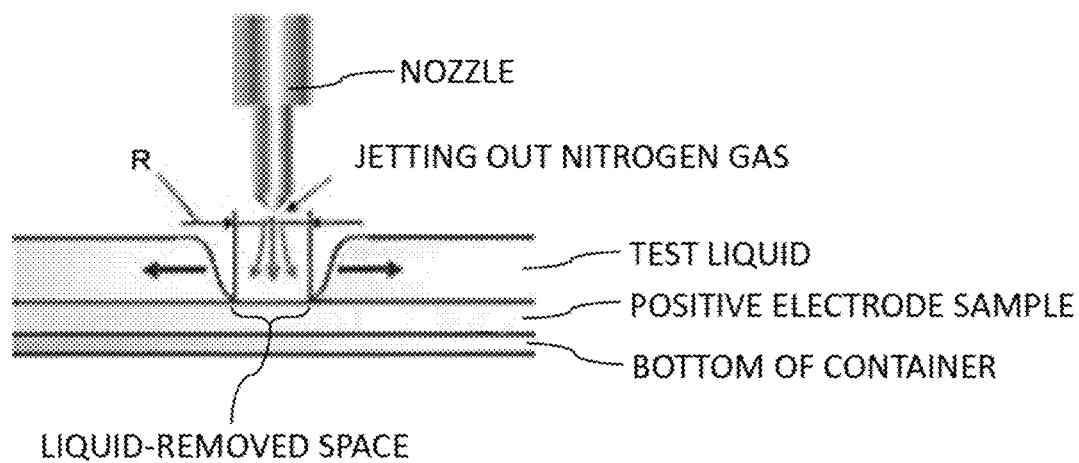
FIG. 2 is a schematic illustration showing a state in the evaluation test for wettability.

The evaluation test for wettability of the positive electrode according to the present embodiment will be described below with reference to FIG. 2.

In the evaluation test for wettability, a positive electrode of interest to be evaluated for wettability is placed in a container, and a lithium hexafluorophosphate solution in a solvent composed of ethylene carbonate (EC) and ethyl methyl carbonate (EMC) in a volume ratio of 3:7 is poured therein so that the height from the surface of the positive electrode to the liquid surface is 1.8 mm, the solution having a lithium hexafluorophosphate concentration of 1.3 mol/L. Nitrogen gas is jetted out perpendicularly to the surface of the positive electrode at a pressure of 10 kPa from a tube having an inner diameter of 0.5 mm in an atmosphere at 20° C. or more and 25° C. or less, the tube being positioned such that the jet nozzle hole thereof is 8 mm apart from the liquid surface. The diameter of the circular space from which the solution is removed by jetting is measured, and the wettability of the surface of the positive electrode is evaluated by the average of the diameter during a period from 0.5 seconds to 1.5 seconds after starting jetting.

The positive electrode sample to be subjected to the evaluation test for wettability preferably has a uniform thickness at least in the area where the surface is to be exposed by jetting the gas. The thickness of the positive electrode is not particularly limited, and may be, for example, 10 µm or more or 30 µm or more and 500 µm or less or 300 μm or less. The positive electrode sample to be subjected to the evaluation test has a sufficiently larger surface area relative to the area from which the solution is removed by jetting the gas, and a sample that is cut out so as to have a circular shape with a diameter of 40 mm is used, for example. The positive electrode sample is placed so that at least the surface to be exposed by jetting the gas is horizontal to subject to the evaluation test for wettability.

The container has a role to keep the positive electrode sample at the bottom thereof and to hold the test liquid described later to the predetermined liquid level. The shape and size of the container is not particularly limited as long as the container has a bottom on which the positive electrode sample can be put and a sidewall or sidewalls to hold the test liquid to the predetermined liquid level. For, example, when a positive electrode sample having a circular shape with a diameter of 40 mm is used, a petri dish having an inner diameter of 50 mm and a depth of 12 mm may be used as the container. The material for forming the container may be a material having no reactivity to the test liquid, and examples of the container include a petri dish made of a fluoro resin or glass. The container may have a surface having undergone coating treatment.

In the evaluation test for wettability, a lithium hexafluorophosphate solution in a solvent composed of ethylene carbonate (EC) and ethyl methyl carbonate (EMC) in a volume ratio of 3:7 is used as the test liquid, the solution having a lithium hexafluorophosphate concentration of 1.3 mol/L. Such a test liquid is poured in the container in which the positive electrode sample is placed, and the amount of the test liquid is adjusted so that the height from the surface of the positive electrode sample to the liquid surface of the test liquid is 1.8 mm.

The evaluation test for wettability includes the step of jetting out nitrogen gas to the surface of the substance covered with the test liquid (also referred to as "the gas-jetting step"). Jetting nitrogen gas in the gas jetting step momentarily removes the test liquid covering the surface of the positive electrode sample to expose the surface of the positive electrode sample. The space formed on this occasion from which the test liquid is removed is also referred to as "the liquid-removed space". FIG. 2 is a schematic illustration showing a state in which the liquid-removed space is formed by the gas jetting step in the evaluation test for wettability according to the present embodiment. The liquid-removed space commonly has a hole-shaped structure having a horizontal circular cross section.

In the gas-jetting step, the nitrogen gas is jetted out from vertically straight above the liquid surface of the test liquid perpendicularly to the surface of the positive electrode sample. In the gas jetting step, the amount of the nitrogen gas jetted and other conditions are tailored so that the pressure applied to the positive electrode sample by jetting the nitrogen gas is 10 kPa. The nitrogen gas is jetted out in a constant amount continuously for at least 1.5 seconds after the start of jetting.

The nitrogen gas is jetted out using a nozzle (tube) having an inner diameter of 0.5 mm and positioned such that the jet nozzle hole thereof is vertically straight above 8 mm apart from the liquid surface of the test liquid. Examples of the jetting means for jetting the nitrogen gas include a device having such a nozzle and a gas supply member, such as a compressor or a gas tank, connected to the nozzle via an appropriate flow channel. Jetting the nitrogen gas can be controlled by an appropriate means for controlling the gas flow. For example, jetting the nitrogen gas can be controlled by an appropriate combinations of an electric pneumatic regulator and a solenoid valve. The control of jetting the nitrogen gas may be made automatically or manually. For example, jetting the nitrogen gas can be automatically controlled by controlling the electric pneumatic regulator and the solenoid valve by a computer.

In the evaluation test for wettability, a dimension of the liquid-removed space formed by jetting the nitrogen gas is measured at least during a period from 0.5 seconds to 1.5 seconds after starting jetting of the nitrogen gas in the gas-jetting step (this step is also referred to as "the dimension-measuring step"). Specifically, the dimension of the liquid-removed space is the diameter R of the area of the positive electrode surface exposed in the bottom of the liquid-removed space (see FIG. 2). In the evaluation test for wettability according to the present embodiment, the wettability of the surface of the positive electrode is evaluated by the average of the diameter R of the liquid-removed space found during a period from 0.5 seconds to 1.5 seconds after the start of jetting the nitrogen gas in the dimension-measuring step. In the evaluation test for wettability according to the present embodiment, the gas jetting step and the dimension-measuring step are carried out in an atmosphere at 20° C. or more and 25° C. or less, preferably in an atmosphere at 23° C.

The specific method and means for measuring the dimension are not particularly limited as long as the dimension of interest can be obtained in a non-contact manner. For example, an image of the liquid-removed space may be taken, whereby the dimension of the liquid-removed space can be obtained from the obtained image. For example, the means for measuring may include an imaging means for taking an image of the liquid-removed space, and also may include a dimension-obtaining means for obtaining the dimension of the liquid-removed space from the image obtained.

The imaging means is not particularly limited as long as it can take an image for obtaining the dimension of interest. The image to be obtained may be a two-dimensional image or a three-dimensional image. The image to be obtained may be a video or a still picture. The number of pixels and frame rate of the image can be appropriately set according to the mode of the measurement. The direction along which the dimension is measured is not particularly limited as long as the dimension of interest can be obtained. For example, the dimension can be measured from, for example, vertically straight above or obliquely above the liquid surface of the test liquid.

For example, the imaging means may be any of those detecting light selected from visible light, infrared, and ultraviolet, and may be preferably any of those detecting visible light. An appropriate digital camera may be used as the imaging means, for example. For taking a three-dimensional image, a stereo camera composed of appropriate digital cameras may be used as the imaging means, and an appropriate 3D scanner may be used. The digital camera may be a CCD camera or CMOS camera. The digital camera may be a video camera or a still camera.

The dimension-obtaining means is not particularly limited as long as it can obtain the dimension of the liquid-removed space from the image. For example, the dimension of the liquid-removed space in the image can be obtained by specifying the area corresponding to the liquid-removed space in the image and measuring the specified area. The dimension may be obtained manually or automatically. In a case where the dimension is obtained automatically, an appropriate image processing software can automatically specify the area corresponding to the liquid-removed space in the image and obtain the dimension of interest.

The actual dimension of the liquid-removed space is calculated from the thus found dimension of the liquid-removed space in the image by, for example, a method involving applying correlation data between the dimension in the image and the actual dimension. Specifically, the measuring means may include a calculating means for calculating the actual dimension of the liquid-removed space from the dimension of the liquid-removed space in the image.

For example, a device for use in the evaluation test for wettability includes: a gas-jetting means for jetting out nitrogen gas to the surface of the positive electrode sample covered with the test liquid; and, as a means for measuring the dimension of the liquid-removed space, an imaging means for taking an image of the liquid-removed space, a dimension-obtaining means for obtaining the dimension of the liquid-removed space from the image obtained, and a calculating means for calculating the actual dimension of the liquid-removed space from the dimension of the liquid-removed space in the image. The device for the evaluation test for wettability may comprise an illuminating means for illuminating the liquid-removed space when taking the image. Examples of the illuminating means include incandescent light, fluorescent light, and light emitting diode.

In the evaluation test for wettability according to the present embodiment, the actual diameter of the liquid-removed space formed by jetting nitrogen gas in the gas-jetting step described above is measured, and the wettability of the surface of the positive electrode is evaluated by the average of the diameter of the liquid-removed space during a period from 0.5 seconds to 1.5 seconds after starting jetting nitrogen gas. The positive electrode 11 according to the present embodiment provides a liquid-removed space having a diameter of 6.5 mm or less, preferably 6.3 mm or less, in the evaluation test for wettability described above. A lithium secondary battery having improved battery cyclic characteristics can be provided by a positive electrode for a lithium secondary battery providing a liquid-removed space having a diameter within the above described range in the evaluation test for wettability.

In a case where a positive electrode that is included in a used lithium secondary battery is evaluated for wettability by the above described evaluation test, the positive electrode taken out is preferably washed with an organic solvent used as a non-aqueous electrolyte, such as ethylene carbonate (EC) and dimethyl carbonate (DMC), followed by carrying out the evaluation test.

The components of the positive electrode 11 according to the present embodiment and the method for producing the positive electrode 11 will be described below.

As the metal foil as the positive electrode current collector of the positive electrode 11, any foil of metal that is stable in the electric potential range of the positive electrode may be used, and for example, it is preferable to use foil of metal such as aluminum or an aluminum alloy. A film with such a metal disposed as an outer layer, and the like can also be used as the positive electrode current collector. The thickness of the positive electrode current collector is preferably 5 μm or more and 40 μm or less, more preferably 10 μm or more and 20 μm or less, in view of the current collecting property, mechanical strength, and other properties.

The positive electrode 11 according to the present embodiment comprises a positive electrode mixture layer including a positive electrode active material, a conductive agent, and a binder on at least one side of the metal foil as the positive electrode current collector. The positive electrode active material included in the positive electrode mixture layer includes a lithium/transition metal complex oxide. The lithium/transition metal complex oxide is an oxide of metal including at least both lithium (Li) and a transition metal element. The lithium/transition metal complex oxide may contain an additional element other than lithium (Li) or the transition metal element.

Examples of the lithium/transition metal complex oxide include a metal oxide having a lamellar crystal structure and represented by the general formula $Li_{1+x}M_aO_{2+b}$, wherein x, a, and b satisfy the conditions of x+a=1, $-0.2 \leq x \leq 0.2$, and $-0.1 \leq b \leq 0.1$, and M is one or more metal elements including at least one element selected from the group consisting of nickel (Ni), manganese (Mn), cobalt (Co), and aluminum (Al). Lithium nickel cobalt manganese oxide, which is represented by the above general formula wherein M includes a combination of Ni, Mn, and Co, or lithium nickel aluminum manganese oxide, which is represented by the above general formula wherein M includes a combination of Ni, Mn, and Al, are particularly preferred as the lithium/transition metal complex oxide.

The lithium/transition metal complex oxide preferably includes nickel in an amount of 80 mol % or more and 95 mol % or less, more preferably 82 mol % or more and 91 mol % or less, based on the total mass of transition metal elements. The reason for this is because the lithium/transition metal complex oxide can be produced stably when the content of the nickel based on the total mass of transition metal elements is within the above range. Also, a lithium secondary battery having a large capacity can be produced by using such a lithium/transition metal complex oxide.

The lamellar lithium/transition metal complex oxide may include an element added in addition to Ni, Co, Mn, and Al, and example thereof include alkali metal elements other than Li, transition metal elements other than Mn, N, or Co, alkaline earth metal elements, Group 12 elements, Group 13 elements other than Al, and Group 14 elements. Specific examples of the other element added include zirconium (Zr), boron (B), magnesium (Mg), titanium (Ti), iron (Fe), copper (Cu), zinc (Zn), tin (Sn), sodium (Na), potassium (K), barium (Ba), strontium (Sr), calcium (Ca), tungsten (W), molybdenum (Mo), niobium (Nb), and silicon (Si).

The composition of the compound as the positive electrode active material may be determined using ICP atomic emission spectrophotometric analyzer (e.g., product name "iCAP 6300", manufactured by Thermo Fisher Scientific).

For the positive electrode active material included in the positive electrode 11, secondary particles formed by aggregation of primary particles of the metal oxide represented by the above described general formula can be synthesized by, for example, mixing a lithium-containing compound, such as lithium hydroxide, and an oxide obtained by firing a hydroxide containing a metal element other than lithium as represented by M in the above described general formula in a mixing ratio intended, and firing the mixture. The firing of the mixture is performed in the air or an oxygen gas flow. The firing temperature is about 500 to 1100° C., and the firing time is about 1 to 30 hours when the firing temperature is 500 to 1100° C.

The particle size of the positive electrode active material is not particularly limited, and for example, the average particle size is preferably 2 μm or more and less than 30 μm. If the average particle size of the positive electrode active material is too small, the positive electrode active material may hinder the conductive path by the conductive agent in the positive electrode mixture layer to impair the battery cyclic characteristics. If the average particle size of the positive electrode active material is too large, the reaction area may be decreased to impair the loading characteristics.

The average particle size of the positive electrode active material is the volume average particle size determined according to the laser diffraction method, and means a median diameter at an integrated volume of 50% in the particle size distribution. The average particle size of the positive electrode active material can be determined with, for example, the laser diffraction/scattering particle size distribution analyzer (manufactured by HORIBA, Ltd.).

The conductive agent included in the positive electrode mixture layer is not particularly limited as long as it is a material that can form a conductive path in the positive electrode mixture layer. Examples of the conductive agent include carbon materials such as carbon black, acetylene black, Ketjenblack, and graphite. These conductive agents may be used singly or in combinations of two or more thereof. Acetylene black, which is inexpensive, is preferably used as the conductive agents.

Examples of the binder included in the positive electrode mixture layer include fluorine-containing polymer materials, such as polytetrafluoroethylene (PTFE) and polyvinylidene fluoride (PVdF), polyacrylonitrile (PAN), polyimide, acrylic resins, and polyolefin. These resins may be combined with carboxymethyl cellulose (CMC) or a salt thereof, poly (ethylene oxide) (PEO), or the like. These binders may be used singly or in combinations of two or more thereof. The fluorine-containing polymer material, which has a strong boning force and a mechanical strength, is preferably used as the binder, and polyvinylidene fluoride (PVdF) is more preferably used.

For example, the positive electrode mixture layer preferably has contents of the lithium/transition metal complex oxide, the conductive agent, and the binder of 97 mass % or more and 99.5 mass % or less, 0.3 mass % or more and 1.5 mass % or less, and 0.1 mass % or more and 1.5 mass % or less, respectively, based on the total mass of the positive electrode mixture layer. The positive electrode mixture layer may contain a component other than the lithium/transition metal complex oxide, the conductive agent, or the binder. Examples of the other component include a positive electrode active material other than the lithium/transition metal complex oxide, and various additives.

<Method for Manufacturing Positive Electrode>

The positive electrode 11 can be produced by applying a positive electrode mixture slurry including the lithium/transition metal complex oxide, the conductive agent, the binder, and other components to a positive electrode current collector, and drying and then pressing the resultant coatings to form positive electrode mixture layers on the both respective sides of the current collector.

The positive electrode mixture slurry is not particularly limited as long as it is a dispersion including a dispersing medium, such as water or N-methyl-2-pyrrolidone (NMP), and the positive electrode active material, the conductive agent, the binder, and other components dispersed in the dispersing medium. A method exemplifies the method for preparing a positive electrode mixture slurry which method comprises: the pre-slurry preparing step of mechanically mixing a positive electrode active material and a binder in advance and then adding a dispersing medium thereto; the agitating step of placing the pre-slurry and a conductive agent in a cylindrical agitating tank of an agitator and performing agitating treatment; and the positive electrode mixture slurry preparing step of finally mixing the resultant mechanically; wherein the agitator comprises the cylindrical agitating tank, and a rotating blade having a cylindrical part with a plurality of holes and provided in the agitating tank, the cylindrical part moving so as to rotate along near the inner surface of the agitating tank, and in the agitating treatment, the pre-slurry and the conductive agent are pressed on the inner surface of the agitating tank by the rotation of the rotating blade so as to be extended into the form of a cylindrical thin film.

Figure 3:
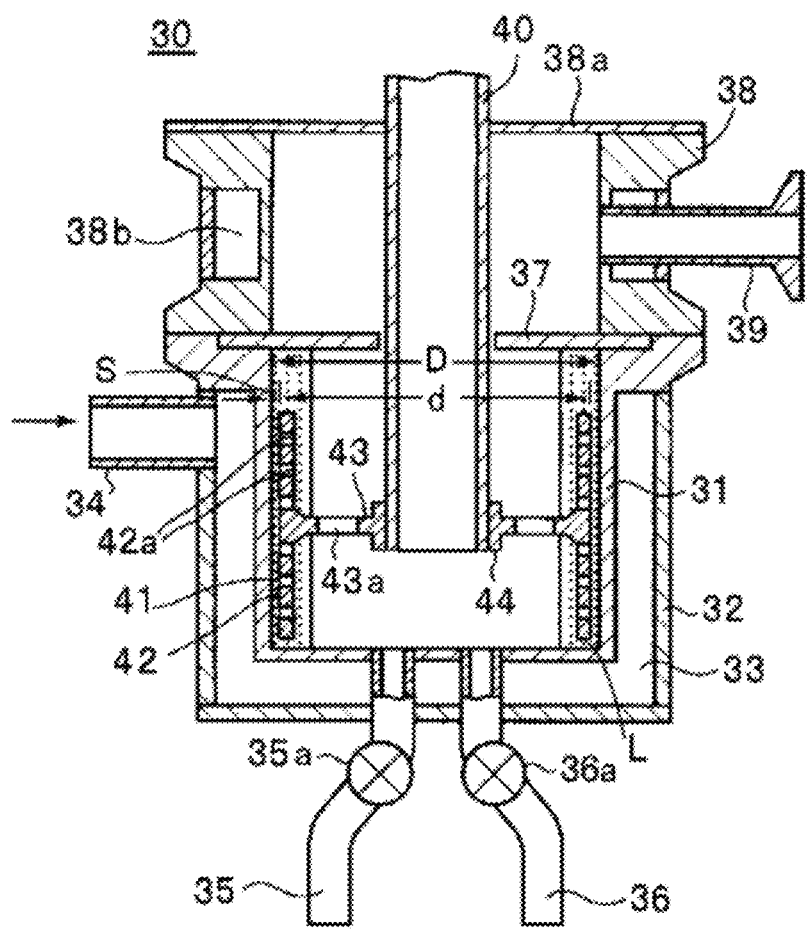
FIG. 3 is a sectional view illustrating a structure of a high-speed agitator for use in producing a positive electrode mixture slurry.

For example, a high-speed agitator 30 shown in FIG. 3 exemplifies the above described agitator for use in the agitating treatment of the pre-slurry and the conductive agent. As will be described in detail below, in the high-speed agitator 30, the slurry is pressed on the inner surface of the agitating tank by the high-speed rotation of the rotating blade so as to be extended into the form of a cylindrical thin film, and the cylindrical part of the rotating blade moves in the slurry in the form of a cylindrical thin film. Thus, a large shearing force can be applied to the slurry to loosen the aggregation of the positive electrode active material and the binder in the slurry, resulting in improved dispersibility.

FIG. 3 is a sectional view illustrating a structure of a high-speed agitator (product name "T.K. FILMIX", manufactured by PRIMIX Corporation) that can be used for the agitating treatment of the pre-slurry and the conductive agent. As illustrated in FIG. 3, an agitating tank 31 having a cylindrical inner surface is provided in the high-speed agitator 30, and an outer tank 32 is provided around the agitating tank 31. A cooling water space 33 is formed between the agitating tank 31 and the outer tank 32. Cooling water is fed into the cooling water space 33 through an inflow pipe 34, absorbs frictional heat generated by agitating, and is discharged through an outflow pipe not shown. Feed pipes 35 and 36 having valves 35a and 36a, respectively, are connected to the bottom of the agitating tank 31. These feed pipes 35 and 36 can be used for feeding the materials, and can also be used for discharging a product in the case of batch production.

A weir board 37 is placed on the top of the agitating tank 31, and an upper container 38 is attached thereon. An outflow pipe 39 is connected to the upper container 38. The upper container 38 has a lid 38a and a cooling water space 38b, which are used when continuously produce a product. In this case, the weir board 37 is replaced another one that has a larger inner diameter than that shown in the drawing, materials are continuously fed through the feed pipes 35 and 36, and the liquid after agitation is handled so as to continuously flow out over the weir board 37. The cooling water space 38b is connected to the cooling water space 33 in parallel on the water channel.

A rotating shaft 40 is pass through the lid 38a in an airtight manner and provided concentrically with the agitating tank 31, and the rotating shaft 40 is driven so as to rotate at a high speed by a motor provided the top thereof. The rotating blade 41 is attached to the lower end of the rotating shaft 40. The rotating blade 41 has a cylindrical part 42, and the cylindrical part 42 is attached to the rotating shaft 40 via arms 43 by bosses 44. A plurality of holes 42a is formed in the cylindrical part 42. The appropriate number of continuous holes 43a are formed in the arm 43.

FIG. 3 shows the state where a slurry L is contained. The slurry L is pressed in the circumferential direction due to high speed rotation of the rotating blade 41 and rotates while being in the form of a cylindrical thin film by the centrifugal force generated by rotation and adhering tightly to the inner surface of the agitating tank 31. The slurry L is subjected to the agitating effect by the gap due to the difference in speed between the surface thereof and the inner surface of the agitating tank 31, so that the positive electrode active material and the binder contained in the slurry L are dispersed. The slurry L that flows in the hole 42a undergoes a strong rotative force due to the rotation of the hole, and flows into the gap S through the hole 42a to increase the pressure and also to disturb the flow of the slurry L in the gap S, which promotes the agitating effect. The rotating speed of the rotating blade 41 in the agitating treatment may be appropriately adjusted according to the positive electrode active material, the binder, and the dispersing medium included in the positive electrode mixture slurry, the conductive agent, and the viscosity of the positive electrode mixture slurry, and for example, the peripheral speed (the speed of the point on the maximum radius) thereof is preferably 10 m/s or more, and more preferably 20 m/s or more. The upper limit of the rotating speed of the rotating blade 41 is not particularly limited, and for example, the peripheral speed thereof is preferably 50 m/s or less.

In preparation of the positive electrode mixture slurry, the step of performing agitating treatment on the slurry containing the positive electrode active material, the binder, the dispersing medium, and the conductive agent using the above described agitator can enhance the dispersibility of the positive electrode active material and the binder to improve wettability of the positive electrode mixture layer, and also the step can lead to production of a positive electrode for a lithium ion secondary battery having excellent battery cyclic characteristics. The method for preparing the positive electrode mixture slurry is not limited to the method described above, and for example, the timing of adding the conductive agent may be changed from just before the step of agitating in the form of a cylindrical thin film described above to just before the positive electrode mixture slurry preparing step of finally mixing the resultant mechanically.

<Negative Electrode for Lithium Secondary Battery>

The negative electrode 12 is composed, for example, of metal foil or the like as a negative electrode current collector and a negative electrode mixture layer formed on the negative electrode current collector. For the negative electrode current collector, any foil of metal that is stable in the electric potential range of the negative electrode, such as copper, a film with such a metal disposed as an outer layer, and the like can be used. The negative electrode mixture layer includes a negative electrode active material and a binder. The negative electrode 12 can be produced by, for example, applying a negative electrode mixture slurry including the negative electrode active material, the binder, and other components to the negative electrode current collector, and drying and then pressing the resultant coatings to form negative electrode mixture layers on the both respective sides of the current collector. The thickness of the negative electrode current collector is preferably 5 µm or more and 40 µm or less, more preferably 10 µm or more and 20 µm or less, in view of the current collecting property, mechanical strength, and other properties.

The negative electrode active material is not particularly limited as long as it can reversibly intercalate and deintercalate lithium ions, and carbon materials such as natural graphite and artificial graphite, Si, Sn, and so on can be used, for example. These may be used singly or two or more thereof may be mixed and used. Particularly, a carbon material obtained by coating a graphite material with low crystalline carbon is preferably used because a film having a small resistance is likely formed on the surface of the negative electrode.

Any known binder can be used as the binder for use in the negative electrode 12, and fluoro resins such as PTFE, PAN, polyimide resins, acrylic resins, polyolefin resins, and the like can be used as in the case of the positive electrode 11. Examples of a binder used when a negative electrode mixture slurry is prepared using an aqueous solvent include CMC and a salt thereof, styrene-butadiene rubber (SBR), polyacrylic acid (PAA) and a salt thereof, and polyvinyl alcohol (PVA).

<Non-Aqueous Electrolyte>

The non-aqueous electrolyte includes a non-aqueous solvent and an electrolyte salt dissolved in the non-aqueous solvent. As the non-aqueous solvent used for the non-aqueous electrolyte, esters, ethers, nitriles, amides such as dimethylformamide, and mixed solvents of two or more thereof can be used. A halogen-substituted product formed by replacing at least one hydrogen atom of any of the above solvents with a halogen atom such as fluorine can also be used.

Examples of the esters that may be included in the non-aqueous electrolyte include cyclic carbonate esters, chain carbonate esters, and carboxylate esters. Specific examples include cyclic carbonate esters, such as ethylene carbonate (EC), propylene carbonate (PC), butylene carbonate, and vinylene carbonate; chain carbonate esters, such as dimethyl carbonate (DMC), methyl ethyl carbonate (EMC), diethyl carbonate (DEC), methyl propyl carbonate, ethyl propyl carbonate, and methyl isopropyl carbonate; chain carboxylate esters such as methyl propionate (MP), ethyl propionate, methyl acetate, ethyl acetate, and propyl acetate; and cyclic carboxylate esters such as γ-butyrolactone (GBL) and γ-valerolactone (GVL).

Examples of the ethers that may be included in the non-aqueous electrolyte include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and chain ethers such as diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Examples of the nitrile that may be included in the non-aqueous electrolyte include acetonitrile, propionitrile, butyronitrile, valeronitrile, n-heptanenitrile, succinonitrile, glutaronitrile, adiponitrile, pimeronitrile, 1,2,3-propanetricarbonitrile, and 1,3,5-pentanetricarbonitrile.

Examples of the halogen-substituted product that may be included in the non-aqueous electrolyte include a fluorinated cyclic carbonate ester such as 4-fluoroethylene carbonate (FEC), a fluorinated chain carbonate ester, a fluorinated chain carboxylate ester such as methyl 3,3,3-fluoropropionate (FMP).

The electrolyte salt for use in the non-aqueous electrolyte is preferably a lithium salt. Examples of the lithium salt include $LiBF_4$, $LiClO_4$, $LiPF_6$, $LiAsF_6$, $LiSbF_6$, $LiAlCl_4$, LiSCN, $LiCF_3SO_3$, $LiC(C_2F_5SO_2)$, $LiCF_3CO_2$, $Li(P(C_2O_4)F_4)$, $Li(P(C_2O_4)F_2)$, $LiPF_{6-x}(C_nF_{2n+1})_x$ (where 1≤x≤6, and n is 1 or 2), $LiB_{10}Cl_{10}$, LiCl, LiBr, LiI, chloroborane lithium, lithium short-chain aliphatic carboxylates; borate salts such as $Li_2B_4O_7$, $Li(B(C_2O_4)_2)$ [lithium bis(oxalate)borate (Li- BOB)], Li(B(C$_2$O$_4$)F$_2$); and imide salts such as LiN(FSO$_2$)$_2$ and LiN(C$_1$F$_{2l-1}$SO$_2$)(C$_m$F$_{2m+1}$SO$_2$) (where l and m are integers of 0 or more). These lithium salts may be used singly or two or more thereof may be mixed and used.

<Separator>

An ion-permeable and insulating porous sheet is used as the separator 13. Specific examples of the porous sheet include a microporous thin film, woven fabric, and nonwoven fabric. Suitable examples of the material for the separator 13 include olefin resins such as polyethylene and polypropylene, and cellulose. The separator 13 may be a laminate including a cellulose fiber layer and a layer of fibers of a thermoplastic resin such as an olefin resin. The separator 13 may be a multi-layered separator including a polyethylene layer and a polypropylene layer, and a separator having a surface coated with a resin such as an aramid resin also can be used as the separator 13.

EXAMPLES

Hereinafter, the present disclosure will be specifically described in more detail by way of Examples and Comparative Examples, but the present disclosure is not limited to the Examples below.

Example 1

[Production of Positive Electrode]

A lithium/transition metal complex oxide and polyvinylidene fluoride (PVDF) (binder) were mechanically mixed in a mass ratio of 125:1. N-methyl-2-pyrrolidone (NMP) as a dispersing medium was added to the mixture in a mass ratio of 30. The resultant was put in a planetary mixer (product name "HIVIS DISPER MIX Model 3D-5", manufactured by PRIMIX Corporation), and agitating treatment was performed for 20 minutes at the number of revolutions of the planetary mixer of 10 rpm and that of a disperser attached of 3000 rpm, to thereby prepare a pre-slurry. Acetylene black (conductive agent) was added to the pre-slurry prepared in a mass ratio thereof to the lithium/transition metal complex oxide of 1.2, and the resultant was fed to the high-speed agitator 30 (product name "T.K. FILMIX", manufactured by PRIMIX Corporation) shown in FIG. 3, followed by agitating treatment for 30 seconds. The circumferential velocity of the rotating blade 41 was 30 m/sec. The agitating tank 31 had an inner diameter D of 80 mm and a depth of 75 mm. The rotating blade 41 had an outer diameter d of 76 mm.

Finally, the resulting mixture was agitated for 15 minutes using a planetary mixer (product name "HIVIS DISPER MIX Model 3D-5", manufactured by PRIMIX Corporation) at 15 rpm, to thereby prepare a positive electrode mixture slurry.

Next, the positive electrode mixture slurry was applied to aluminum foil as a positive electrode current collector, and the coatings were dried and then pressed with mill rolls, to thereby produce a positive electrode having positive electrode mixture layers formed on the both respective sides of the aluminum foil.

[Production of Negative Electrode]

Graphite powder, carboxymethyl cellulose (CMC), and styrene-butadiene rubber (SBR) were mixed in a mass ratio of 98:1:1. Water was added to the mixture, and the resultant was agitated using a mixer ("T.K. HIVIS MIX", manufactured by PRIMIX Corporation), to thereby prepare a negative electrode mixture slurry. Then, the negative electrode mixture slurry was applied to copper foil as a negative electrode current collector, and the coatings were dried and then pressed with mill rolls, to thereby produce a negative electrode having negative electrode mixture layers formed on the both respective sides of the copper foil.

[Preparation of Non-Aqueous Electrolyte]

Ethylene carbonate (EC), ethyl methyl carbonate (EMC), and dimethyl carbonate (DMC) were mixed in a volume ratio of 30:30:40. LiPF$_6$ was dissolved in the mixed solvent to a concentration of 1.0 mol/L. In addition, vinylene carbonate was dissolved in the mixed solvent in an amount corresponding to a concentration of 1.0 mass % based on the mixed solvent, to thereby produce a non-aqueous electrolyte.

[Production of Battery]

An aluminum lead and a nickel lead were attached to the above described positive electrode and negative electrode, respectively. A microporous film made of polyethylene was used as a separator. The positive electrode and the negative electrode with the separator interposed therebetween were spirally wound, to thereby produce an electrode assembly having a wound structure. The electrode assembly was housed in a cylindrical case body having a closed-end. The non-aqueous electrolyte described above was injected thereinto, and the opening of the case body was then sealed with a gasket and a sealing assembly, to thereby produce a cylindrical lithium secondary battery shown in FIG. 1.

Example 2

A positive electrode and a cylindrical lithium secondary battery were produced in the same manner as in Example 1, except that in preparation of the positive electrode mixture slurry, agitating treatment of the pre-slurry using the high-speed agitator 30 was performed at a circumferential velocity of the rotating blade 41 of 20 m/sec.

Comparative Example 1

A positive electrode and a cylindrical lithium secondary battery were produced in the same manner as in Example 1, except that in preparation of the positive electrode mixture slurry, agitating treatment of the prepared pre-slurry using the high-speed agitator 30 was not performed and that agitating treatment using the planetary mixer was further performed for 30 minutes at 40 rpm.

[Evaluation Test for Wettability]

A test liquid was prepared by dissolving lithium hexafluorophosphate in a solvent consisting of ethylene carbonate (EC) and ethyl methyl carbonate (EMC) in a volume ratio of 3:7 to a concentration of 1.3 mol/L. A positive electrode sample was placed at the bottom of a polystyrene-made petri dish, and the test liquid was poured therein so that the height from the surface of the positive electrode to the liquid surface was 8 mm. The container was positioned so that the center of the positive electrode sample corresponded to the point vertically below a nozzle having an inner diameter of 0.5 mm. Next, nitrogen gas was jetted out perpendicularly to the positive electrode sample from the nozzle to momentarily remove the test liquid covering the surface of the positive electrode sample, thereby exposing the surface of the positive electrode sample. The amount of nitrogen gas jetted was controlled so that the pressure applied to the positive electrode sample by jetting was 10 kPa.

Figure 4:
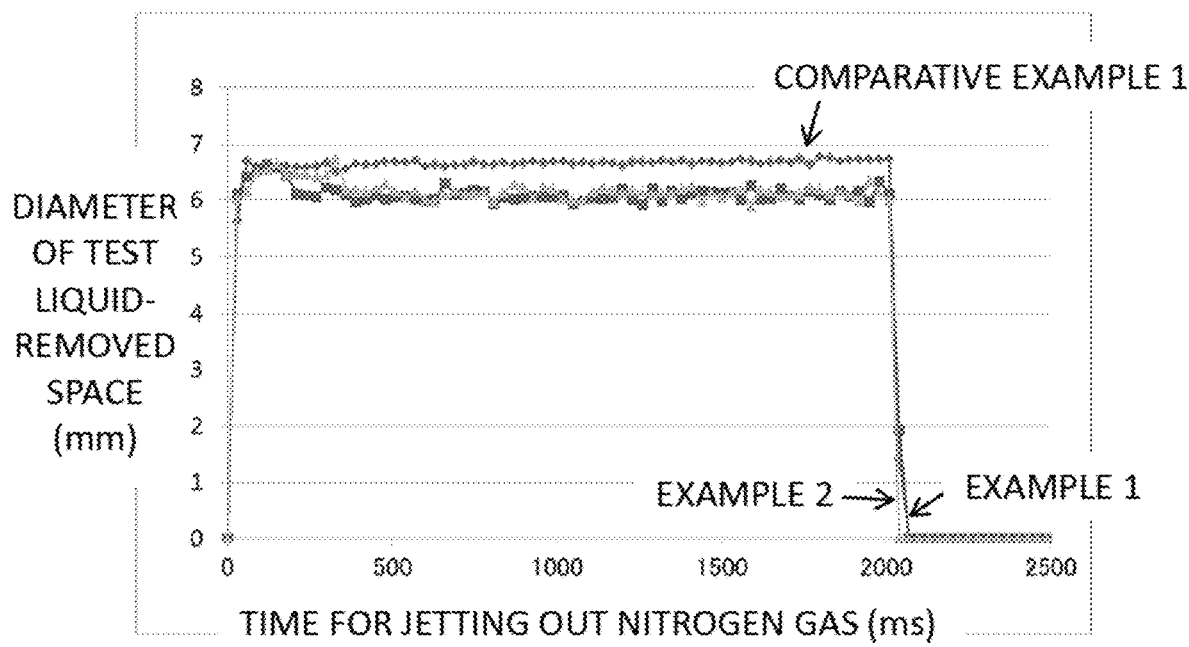
FIG. 4 is a chart of measurement results in the evaluation test for wettability in Examples.

The diameter of the circular space from which the test liquid was removed by jetting out nitrogen gas was measured, and the average of the diameter during the period from 0.5 seconds to 1.5 seconds after starting jetting, i.e., the diameter of the liquid-removed space was calculated. FIG. 4 shows the variation of the diameter of the liquid-removed space found in the evaluation test for wettability on each positive electrode sample. In this evaluation test for wettability in Examples, nitrogen gas was jetted out for 2 seconds.

[Test for Battery Cyclic Characteristics]

A charge/discharge cyclic test was carried out on each of the batteries according to Examples and Comparative Example. Specifically, charge/discharge cycles were repeatedly carried out 1000 times on each battery in a temperature condition of 25° C., a single charge/discharge cycle consisting of a constant current charge at a current of 0.3 It based on the design capacity of the battery to 4.2 V, a quiescent period of 15 minutes, a constant current discharge at a current of 0.5 It to 2.5V, and another quiescent period of 15 minutes. The ratio (percentage) of the discharge capacity found at the 800th cycle to the first discharge capacity (the discharge capacity at the first cycle) was calculated as the capacity retention rate, and the battery cyclic characteristics of each battery was evaluated by the capacity retention rate.

Table 1 shows the diameter of the liquid-removed space in the evaluation test for wettability on the positive electrode and the capacity retention rate after the charge/discharge cyclic test in each of Examples and Comparative Example.

TABLE 1

|  | Diameter of Liquid-Removed Space (mm) | Capacity Retention Rate (%) |
| --- | --- | --- |
| Example 1 | 6.1 | 72 |
| Example 2 | 6.1 | 74 |
| Comparative Example 1 | 6.7 | 68 |

As it is clear from the results in Table 1, a battery prepared by using a positive electrode according to the present embodiment, which provides a diameter of the liquid-removed space of 6.5 mm or less in the evaluation test for wettability, has a significantly excellent capacity retention rate after the test for cyclic characteristics compared to a battery prepared by using a positive electrode that provides a diameter of the liquid-removed space of more than 6.5 mm.

REFERENCE SIGNS LIST 10 battery (lithium secondary battery)
11 positive electrode (positive electrode for lithium secondary battery)
12 negative electrode (negative electrode for lithium secondary battery)
13 separator
14 electrode assembly
15 case body
16 sealing assembly
17, 18 insulating plate
19 positive electrode lead
20 negative electrode lead
21 projecting portion
22 filter
22a, 26a opening
23 lower vent member
24 insulating member
25 upper vent member
26 cap
27 gasket
30 high-speed agitator
31 agitating tank
32 outer tank
33, 38b cooling water space
34 inflow pipe
35, 36 feed pipe
35a, 36a valve
37 weir board
38 upper container
38a lid
39 outflow pipe
40 rotating shaft
41 rotating blade
42 cylindrical part
42a hole
43 arm
43a continuous hole
44 boss
L slurry
S gap

The invention claimed is:

1. A method for performing an evaluation test for wettability of a positive electrode to an electrolyte solution, including:
a first step of placing a positive electrode in a container;
a second step of covering a surface of the positive electrode with a predetermined solution;
a third step of jetting out nitrogen gas at a predetermined pressure to the surface of the positive electrode covered with the predetermined solution and measuring a diameter of a space from which the solution is removed during jetting; and
a fourth step of calculating an average of the diameter of the space from which the solution is removed during jetting,
wherein the average is taken as a diameter of a liquid-removed space.

2. The method for performing an evaluation test for wettability of a positive electrode to an electrolyte solution according to claim 1, wherein the predetermined solution is a lithium hexafluorophosphate solution in a solvent composed of ethylene carbonate and ethyl methyl carbonate in a volume ratio of 3:7, the solution having a lithium hexafluorophosphate concentration of 1.3 mol/L.

3. The method for performing an evaluation test for wettability of a positive electrode to an electrolyte solution according to claim 1, wherein, in the second step, the predetermined solution is poured into the container so that a height from the surface of the positive electrode to a liquid surface of the predetermined solution is 1.8 mm.

4. The method for performing an evaluation test for wettability of a positive electrode to an electrolyte solution according to claim 1, wherein, in the third step, the nitrogen gas is jetted out perpendicularly to the surface of the positive electrode at a pressure of 10 kPa from a tube having an inner diameter of 0.5 mm in an atmosphere at 20° C. or more and 25° C. or less, the tube being positioned such that a jet nozzle hole thereof is 8 mm apart from a liquid surface.

5. The method for performing an evaluation test for wettability of a positive electrode to an electrolyte solution according to claim 1, wherein, in the fourth step, the average of the diameter during a period from 0.5 seconds to 1.5 seconds after starting jetting the nitrogen gas is calculated.

6. A positive electrode for a lithium secondary battery, comprising:
metal foil; and
a positive electrode mixture layer formed on at least one side of the metal foil and including a lithium/transition metal complex oxide as a positive electrode active material, a conductive agent, and a binder, wherein contents of the lithium/transition metal complex oxide, the conductive agent, and the binder are 97 mass % or more and 99.5 mass % or less, 0.3 mass % or more and 1.5 mass % or less, and 0.1 mass % or more and 1.5 mass % or less, respectively, based on a total mass of the positive electrode mixture layer, and wherein the positive electrode provides a liquid-removed space having a diameter of 6.5 mm or less in the evaluation test for wettability according to claim 1.

7. The positive electrode for a lithium secondary battery according to claim 6, wherein the metal foil is of aluminum or an aluminum alloy, the lithium/transition metal complex oxide includes, as a transition metal element, a combination of nickel, manganese and cobalt or a combination of nickel, manganese and aluminum, the conductive agent is a carbon material, and the binder is a fluorine-containing polymer material.

8. The positive electrode for a lithium secondary battery according to claim 6, wherein the conductive agent is acetylene black, and the binder is polyvinylidene fluoride.

9. The positive electrode for a lithium secondary battery according to claim 6, wherein the lithium/transition metal complex oxide includes 80 mol % or more and 95 mol % or less of nickel based on a total mass of transition metal elements.

10. A lithium secondary battery comprising the positive electrode for a lithium secondary battery according to claim 6.

\* \* \* \* \*